United States Patent [19]
Deimel

[11] Patent Number: 4,915,475
[45] Date of Patent: Apr. 10, 1990

[54] OPTICAL RESONATOR ESPECIALLY FOR STABILIZING A LASER SOURCE

[75] Inventor: Peter Deimel, Langenpreising, Fed. Rep. of Germany

[73] Assignee: Messerschmitt-Boelkow-Blohm GmbH, Munich, Fed. Rep. of Germany

[21] Appl. No.: 209,344

[22] Filed: Jun. 20, 1988

[30] Foreign Application Priority Data

Aug. 1, 1987 [DE] Fed. Rep. of Germany ....... 3725573

[51] Int. Cl.⁴ ............................. H01S 3/08; G02B 5/18
[52] U.S. Cl. .................................. 350/162.2; 372/102; 372/93
[58] Field of Search ........................ 350/162.17, 162.2; 372/92, 93, 102

[56] References Cited
FOREIGN PATENT DOCUMENTS 2449123  4/1976  Fed. Rep. of Germany .
3144839  8/1982  Fed. Rep. of Germany .
2595013  8/1987  France ................................. 372/102

OTHER PUBLICATIONS

Ludeke, R. et al., "Fabrication for a Tunable Monochromatic Injection Laser", *IBM Technical Disclosure Bulletin*, vol. 15, No. 2, Jul. 1972, pp. 546–547.

Primary Examiner—Rodney B. Bovernick
Assistant Examiner—Terry S. Callaghan
Attorney, Agent, or Firm—W. G. Fasse; D. H. Kane, Jr.

[57] ABSTRACT

An optical resonator for stabilizing a laser source is useful for homodyne and heterodyne applications. The structural resonator length is considerably reduced by placing a laser source, such as a semiconductor laser (10) in an opening of an optical grating, whereby the laser beam is directed onto a parabolic mirror (15), which reflects the laser beam onto the grating (11). Thus, a "folded" beam path results.

2 Claims, 1 Drawing Sheet

OPTICAL RESONATOR ESPECIALLY FOR STABILIZING A LASER SOURCE

FIELD OF THE INVENTION

The invention relates to an optical resonator especially for stabilizing a laser source useful for homodyne or heterodyne applications. A grating is arranged at an angle relative to the optical axis of the laser source.

DESCRIPTION OF THE PRIOR ART

Such resonators are known in various versions. For example, German Patent Publication DE-OS 3,144,839 discloses a laser with an unstable optical cavity having an output mirror with an extra-axial or off-axis opening through which a laser beam may be emitted in order to maintain a laser effect in an active medium. The output mirror is shaped and arranged so that it exposes an elliptical cross-section to the impinging laser beam. As is already clear from the drawing of the above publication, the resonator requires a relatively large spacial volume, that is to say, it has a long structural length.

Furthermore, German Patent Publication DE-AS 2,449,123 discloses an output coupling mirror for astable laser resonators with a light-permeable or transparent central region and a highly reflective rim or edge zone. The described output coupling mirror is arranged at an angle in the beam path of the resonator. Even in the arrangement described therein, a relatively large structural size and hence a large space requirement cannot be avoided.

OBJECTS OF THE INVENTION

In view of the foregoing it is the aim of the invention to achieve the following objects singly or in combination:

to construct a laser resonator in such a manner that a considerable reduction of the structural length of the laser resonator is achieved;

to reduce the weight and amount of required material in such a laser resonator; and to achieve an improved adjustability of the laser resonator components, with a decreased adjustment effort.

SUMMARY OF THE INVENTION

The above objects have been achieved in a laser resonator for stabilizing laser sources according to the invention, wherein a laser is arranged to emit a beam through a central opening of a grating arranged at an angle relative to the optical axis of the laser. The laser beam is directed through the central opening of the grating and then onto a parabolic mirror from which it is reflected or "folded back" onto the grating. Thus, a folded beam path is formed in a laser resonator so that the structural length of the resonator may be reduced by at least one half. The laser and the grating are connected to an adjustment mechanism which may have a quite simple construction.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
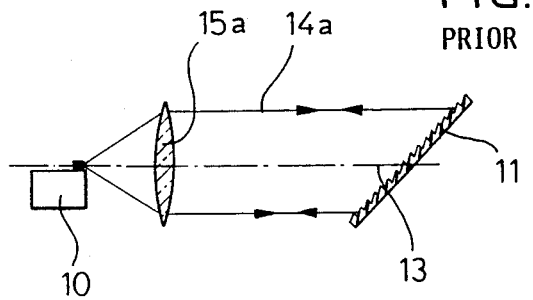
FIG. 1 is a schematic side view in partial section through a laser resonator according to the prior art.

As shown in FIG. 1, the typical solid state resonators are constructed so that the light 14a emitted by a laser light source 10 is projected through a lens 15a onto a grating 11 which is arranged at an angle relative to the optical axis 13. The structural size or space required by the resonator is relatively high, as dictated by the necessary developed length of the beam path, including for instance the focal length of the lens 15a.

Figure 2:
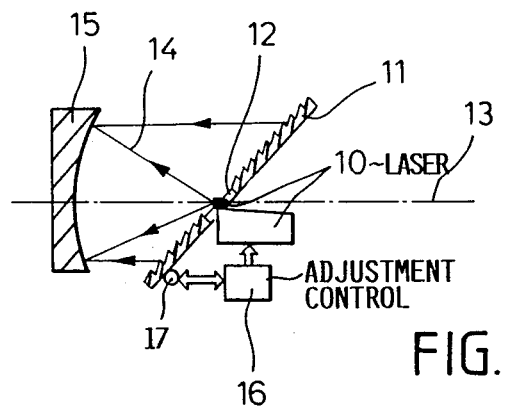
FIG. 2 is a schematic side view in partial section through an embodiment of a laser resonator according to the invention.

As shown in FIG. 2, the total structural length or size of the resonator may be reduced according to the invention. Here, a solid state laser 10 is arranged essentially in a central opening 12 of a grating 11, which is arranged at an angle relative to the optical axis 13 of the laser 10. The beam 14 of the laser 10 is directed through the opening 12 onto a parabolic mirror 15 from which it is reflected or "folded back" onto the grating 11. In this manner, it is achieved that the space taken up by the resonator arrangement is reduced by at least half relative to the previously necessary space according to the state of the art.

The present "folded" optical resonator achieves further advantages including a considerably simplified adjusting and directing of the laser 10 relative to the grating 11. The laser 10 is supported in the central opening 12 of the grating 11 by conventional means not shown. An adjustment controller 16, which may be a manual control or an automatic control, operates an adjustment drive 17 which is effective to tilt the grating 11 about one of its spacial axes, or to slide the grating 11 laterally in its plane relative to the laser 10. Once the parabolic mirror and the grating are aligned, the fine tuning is done by x-y-z-control of the laser diode. The tilting of the grating determines the wave length to be emitted by the laser. Laser and grating should not be connected to achieve better adjustability. The adjustment controller 16 is connected at 17 to the grating 11. The controller 16 may also be effective on the laser 10 as shown by the arrow leading from the controller 16 to the laser 10 in FIG. 2. The adjustment and supporting elements 16, 17 may have a relatively simple and compact construction and may operate in several different manners, whereby the elements 16, 17 are merely represented schematically in FIG. 2. Conventional position adjustments are suitable for the present purposes.

Although the invention has been described with reference to specific example embodiments, it will be appreciated, that it is intended to cover all modifications and equivalents within the scope of the appended claims.

What I claim is:

1. An optical resonator for stabilizing a laser source having an optical axis, comprising grating means having a central opening, said laser source being arranged in said central opening so that said optical axis of said laser source extends at an angle relative to a plane defined by said grating, and parabolic mirror means arranged in a beam path of said laser source, whereby said parabolic mirror means reflect a laser beam onto said grating for forming a folded laser resonator.

2. The optical resonator of claim 1, further comprising adjusting means (16) arranged for adjusting the position of said grating and for adjusting said laser source.

* * * * *